(12) United States Patent
Zhang et al.

(10) Patent No.: US 10,404,347 B2
(45) Date of Patent: Sep. 3, 2019

(54) BEAMFORMING IN TDD MIMO SYSTEMS WITH ASYMMETRIC ANTENNA CONFIGURATION

(71) Applicant: QUALCOMM Incorporated, San Diego, CA (US)

(72) Inventors: Xiaoxia Zhang, San Diego, CA (US); Wei Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/462,440

(22) Filed: Mar. 17, 2017

(65) Prior Publication Data

US 2018/0019795 A1  Jan. 18, 2018

Related U.S. Application Data

(60) Provisional application No. 62/361,802, filed on Jul. 13, 2016, provisional application No. 62/363,165, filed on Jul. 15, 2016.

(51) Int. Cl.
*H04B 7/02* (2018.01)
*H04B 7/06* (2006.01)
(Continued)

(52) U.S. Cl.
CPC ......... *H04B 7/0632* (2013.01); *H04B 7/0486* (2013.01); *H04B 7/0628* (2013.01);
(Continued)

(58) Field of Classification Search
CPC .. H04B 7/0617; H04B 7/0456; H04B 7/0632; H04B 7/0417; H04B 7/0669;
(Continued)

(56) References Cited

U.S. PATENT DOCUMENTS

2010/0238824 A1  9/2010  Farajidana et al.
2010/0255790 A1  10/2010  Farajidana et al.
(Continued)

FOREIGN PATENT DOCUMENTS

WO   WO-2016164058 A1   10/2016

OTHER PUBLICATIONS

<span style="font-family: calibri;">CATT: "Study on Channel Reciprocity in LTE-A", R1-093542, 3GPP TSG RAN WG1 Meeting #58, Shenzhen, China, Aug. 24-28, 2009, pp. 1-7.
(Continued)

*Primary Examiner* — Zewdu A Kassa
(74) *Attorney, Agent, or Firm* — Norton Rose Fulbright LLP

(57) ABSTRACT

Beamforming in time division duplex (TDD) multiple input, multiple output (MIMO) systems is discussed involving user equipments (UEs) having asymmetric antenna configurations. Aspects of the present disclosure use different combinations of signaling overhead and feedback along with leveraging the channel reciprocity characteristics of TDD systems in order to determine channel estimates for determining beamforming vectors. Additional aspects determine scheduling between UEs with symmetric receiver/transmission chains and asymmetric receiver/transmission chains to optimize reference signal overhead for groups of UEs with common beamforming processes.

30 Claims, 11 Drawing Sheets

(51) Int. Cl.
*H04B 7/0456* (2017.01)
*H04L 1/00* (2006.01)
*H04L 5/00* (2006.01)

(52) U.S. Cl.
CPC .......... *H04L 1/0003* (2013.01); *H04L 1/0009* (2013.01); *H04L 1/0026* (2013.01); *H04L 5/0048* (2013.01)

(58) Field of Classification Search
CPC ..... H04L 1/0618; H04L 1/06; H04L 25/0204; H04L 27/2647; H04L 5/0007; H04L 27/2657; H04L 27/2662; H04B 5/0048
USPC ................ 375/267, 260, 259, 316, 295, 219
See application file for complete search history.

(56) References Cited

U.S. PATENT DOCUMENTS

| | | | |
|---|---|---|---|
| 2014/0003266 A1 | 1/2014 | Gomadam | |
| 2015/0244513 A1* | 8/2015 | Hartman | .............. H04J 3/06 370/350 |
| 2017/0141823 A1* | 5/2017 | Fodor | .............. H04B 7/0456 |
| 2018/0091207 A1* | 3/2018 | Kakishima | ........... H04B 7/0626 |

OTHER PUBLICATIONS

Qualcomm Incorporated: "Impact of PRB Bundling on TDD Operation with Asymmetric UE Antenna Configuration", R1-110917, 6.2.2, 3GPP TSG-RAN WG1 #64, Taipei, Taiwan, Jan. 21-25, 2011, pp. 1-5.
<span style="font-family: calibri;">Qualcomm Incorporated: "Issues from Real-Life DL MIMO Deployments", R1-111687, 3GPP TSG-RAN WG1 #65, Barcelona, Spain, May 9-13, 2011, pp. 1-5.
ZTE: "Considerations on the Enhancement for Partial Reciprocity in TDD", R1-112256, 6.6.1, 3GPP TSG-RAN WG1#66, Athens, Greece, Aug. 22-26, 2011, pp. 1-4.
CMCC: "Considerations on Hybrid Non-preceded CSI-RS and Beamformed CSI-RS," 3GPP Draft; R1-164880, 3rd Generation Partnership Project (3GPP), Mobile Competence Centre ; 650, Route Des Lucioles; F-06921 Sophia-Antipolis Cedex; France, vol. RAN WG1, No. Nanjing, China; May 23-May 27, 2016, May 13, 2016 (May 13, 2016), XP051096844, URL:http://www.3gpp.org/ftpftsg ran/WG1 RL 1/TSGR1 85/Docs/ , 3 pages.
Huawei et al: "Discussion on Reciprocity Based DL CSI Feedback," 3GPP Draft; R1-1701683, 3rd Generation Partnership Project (3GPP), Mobile Competence Centre; 650, Route Des Lucioles; F-06921 Sophia-Antipolis Cedex; France vol. RAN WG1, No. Athens, Greece; Feb. 13-Feb. 17, 2017, Feb. 12, 2017 (Feb. 12, 2017), XP051208849, URL:http://www.3gpp.org/ftp/Meetings_3GPP_SYNC/RAN1/Docs/, 3 pages.
International Search Report and Written Opinion—PCT/US2017/034740—ISA/EPO—Aug. 28, 2017.
Qualcomm Incorporated: "CSI Acquisition for Reciprocity Based Operation," 3GPP Draft; R1-1708591, 3rd Generation Partnership Project (3GPP), Mobile Competence Centre; 650, Route Des Lucioles; F-06921 Sophia-Antipolis Cedex; France vol. RAN WG1, No. Hangzhou, China; May 15-May 19, 2017, May 7, 2017 (May 7, 2017), XP051263230, URL:http:ffwww.3gpp.org/ftp/tsg ran/WG1 RL1/TSGR1 89/Docs/, pp. 1-5.

\* cited by examiner

BEAMFORMING IN TDD MIMO SYSTEMS WITH ASYMMETRIC ANTENNA CONFIGURATION

CROSS-REFERENCE TO RELATED APPLICATIONS

This application claims the benefit of U.S. Provisional Patent Application No. 62/361,802, entitled, "BEAMFORMING IN TDD MIMO SYSTEMS WITH ASYMMETRIC ANTENNA CONFIGURATION," filed on Jul. 13, 2016 and U.S. Provisional Patent Application No. 62/363,165, entitled, "UPLINK REFERENCE SIGNAL DESIGN FOR IMPLICIT CHANNEL FEEDBACK," filed on Jul. 15, 2016, which is expressly incorporated by reference herein in its entirety.

BACKGROUND

Field

Aspects of the present disclosure relate generally to wireless communication systems, and more particularly, to beamforming in time division duplex (TDD) multiple input, multiple output (MIMO) systems with user equipments (UEs) having asymmetric antenna configurations.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication in a time division duplex (TDD) multiple input, multiple output (MIMO) system includes receiving an uplink reference signal from a served UE on each channel corresponding to one or more transmit antennas of the served UE, wherein the one or more transmit antennas are fewer than a plurality of receive antennas of the served UE, calculating a downlink channel estimate based on the uplink reference signal, beamforming data using a precoder selected based on the downlink channel estimate, and transmitting the beamformed data to the served UE.

In an additional aspect of the disclosure, a method of wireless communication in a TDD MIMO system includes transmitting, from a base station, a channel state information (CSI) reference signal (CSI-RS) on each of a plurality of antennas ports of the base station, receiving one or more transmission signals from a served UE, wherein the one or more transmission signals relates to a channel quality at the served UE (e.g., a sounding reference signal (SRS), a channel estimate for the unmatched receive antennas, rank indicator, layer selection, and the like) and wherein the served UE includes one or more receive antennas with transmission capability and one or more unmatched receive antennas, wherein the one or more unmatched receive antennas includes a plurality of receive antennas at the served UE minus the one or more receive antennas with transmission capability, selecting a precoder based on the one or more transmission signals, and sending a beamformed transmission to the served UE, wherein the beamformed transmission is beamformed using the selected precoder.

In an additional aspect of the disclosure, a method of wireless communication in a TDD MIMO system includes detecting a CSI-RS at a UE from a base station, transmitting an SRS to the base station on each of one or more receive antennas with transmission capability, generating a channel estimate for one or more unmatched receive antennas using the CSI-RS, wherein the one or more unmatched receive antennas include a plurality of receive antennas of the UE minus the one or more receive antennas with transmission capability, transmitting the channel estimate to the base station, and receiving beamformed communications from the base station, wherein the beamformed communications are beamformed with a precoder associated with at least the channel estimate.

In an additional aspect of the disclosure, a method of wireless communication in a TDD MIMO system includes detecting a CSI-RS at a UE from a base station, obtaining one or more precoders based on an estimated downlink channel of one or more receive antennas with transmission capability of the UE using the CSI-RS, selecting one or more additional precoders for one or more unmatched receive antennas, combining the one or more precoders with the one or more additional precoders into a combined set of precoders, and feeding back a rank indicator and layer selection to the base station, wherein the rank indicator and layer selection are determined based on an effective channel associated with the combined set of precoders.

In an additional aspect of the disclosure, an apparatus configured for wireless communication in a TDD MIMO system includes means for receiving an uplink reference signal from a served UE on each channel corresponding to one or more transmit antennas of the served UE, wherein the one or more transmit antennas are fewer than a plurality of receive antennas of the served UE, means for calculating a downlink channel estimate based on the uplink reference signal, means for beamforming data using a precoder selected based on the downlink channel estimate, and means for transmitting the beamformed data to the served UE.

In an additional aspect of the disclosure, an apparatus configured for wireless communication in a TDD MIMO system includes means for transmitting, from a base station, a CSI-RS on each of a plurality of antennas ports of the base station, means for receiving one or more transmission signals from a served UE, wherein the one or more transmission signals relates to a channel quality at the served UE and wherein the served UE includes one or more receive antennas with transmission capability and one or more unmatched receive antennas, wherein the one or more unmatched receive antennas includes a plurality of receive antennas at the served UE minus the one or more receive antennas with transmission capability, means for selecting a precoder based on the one or more transmission signals, and means for sending a beamformed transmission to the served UE, wherein the beamformed transmission is beamformed using the selected precoder.

In an additional aspect of the disclosure, an apparatus configured for wireless communication in a TDD MIMO system includes means for detecting a CSI-RS at a UE from a base station, means for transmitting a SRS to the base station on each of one or more receive antennas with transmission capability, means for generating a channel estimate for one or more unmatched receive antennas using the CSI-RS, wherein the one or more unmatched receive antennas include a plurality of receive antennas of the UE minus the one or more receive antennas with transmission capability, means for transmitting the channel estimate to the base station, and means for receiving beamformed communications from the base station, wherein the beamformed communications are beamformed with a precoder associated with at least the channel estimate.

In an additional aspect of the disclosure, an apparatus configured for wireless communication in a TDD MIMO system includes means for detecting a CSI-RS at a UE from a base station, means for obtaining one or more precoders based on an estimated downlink channel of one or more receive antennas with transmission capability of the UE using the CSI-RS, means for selecting one or more additional precoders for one or more unmatched receive antennas, means for combining the one or more precoders with the one or more additional precoders into a combined set of precoders, and means for feeding back a rank indicator and layer selection to the base station, wherein the rank indicator and layer selection are determined based on an effective channel associated with the combined set of precoders.

In an additional aspect of the disclosure, a non-transitory computer-readable medium having program code recorded thereon. When executed by a computer, the program code causes the computer to control or implement the functionality based on the instructions of the program code. The program code further includes code to receive an uplink reference signal from a served UE on each channel corresponding to one or more transmit antennas of the served UE, wherein the one or more transmit antennas are fewer than a plurality of receive antennas of the served UE, code to calculate a downlink channel estimate based on the uplink reference signal, code to beamform data using a precoder selected based on the downlink channel estimate, and code to transmit the beamformed data to the served UE.

In an additional aspect of the disclosure, a non-transitory computer-readable medium having program code recorded thereon. When executed by a computer, the program code causes the computer to control or implement the functionality based on the instructions of the program code. The program code further includes code to transmit, from a base station, a CSI-RS on each of a plurality of antennas ports of the base station, code to receive one or more transmission signals from a served UE, wherein the one or more transmission signals relates to a channel quality at the served UE and wherein the served UE includes one or more receive antennas with transmission capability and one or more unmatched receive antennas, wherein the one or more unmatched receive antennas includes a plurality of receive antennas at the served UE minus the one or more receive antennas with transmission capability, code to select a precoder based on the one or more transmission signals, and code to send a beamformed transmission to the served UE, wherein the beamformed transmission is beamformed using the selected precoder.

In an additional aspect of the disclosure, a non-transitory computer-readable medium having program code recorded thereon. When executed by a computer, the program code causes the computer to control or implement the functionality based on the instructions of the program code. The program code further includes code to detect a CSI-RS at a UE from a base station, code to transmit a SRS to the base station on each of one or more receive antennas with transmission capability, code to generate a channel estimate for one or more unmatched receive antennas using the CSI-RS, wherein the one or more unmatched receive antennas include a plurality of receive antennas of the UE minus the one or more receive antennas with transmission capability, code to transmit the channel estimate to the base station, and code to receive beamformed communications from the base station, wherein the beamformed communications are beamformed with a precoder associated with at least the channel estimate.

In an additional aspect of the disclosure, a non-transitory computer-readable medium having program code recorded thereon. When executed by a computer, the program code causes the computer to control or implement the functionality based on the instructions of the program code. The program code further includes code to detect a CSI-RS at a UE from a base station, code to obtain one or more precoders based on an estimated downlink channel of one or more receive antennas with transmission capability of the UE using the CSI-RS, code to select one or more additional precoders for one or more unmatched receive antennas, code to combine the one or more precoders with the one or more additional precoders into a combined set of precoders, and code to feed back a rank indicator and layer selection to the base station, wherein the rank indicator and layer selection are determined based on an effective channel associated with the combined set of precoders.

In an additional aspect of the disclosure, an apparatus configured for wireless communication is disclosed. The apparatus includes at least one processor, and a memory coupled to the processor. The processor is configured to receive an uplink reference signal from a served UE on each channel corresponding to one or more transmit antennas of the served UE, wherein the one or more transmit antennas are fewer than a plurality of receive antennas of the served UE, to calculate a downlink channel estimate based on the uplink reference signal, to beamform data using a precoder selected based on the downlink channel estimate, and to transmit the beamformed data to the served UE.

In an additional aspect of the disclosure, an apparatus configured for wireless communication is disclosed. The apparatus includes at least one processor, and a memory coupled to the processor. The processor is configured to transmit, from a base station, a CSI-RS on each of a plurality of antennas ports of the base station, to receive one or more transmission signals from a served UE, wherein the one or more transmission signals relates to a channel quality at the served UE and wherein the served UE includes one or more receive antennas with transmission capability and one or more unmatched receive antennas, wherein the one or more unmatched receive antennas includes a plurality of receive antennas at the served UE minus the one or more receive antennas with transmission capability, to select a precoder based on the one or more transmission signals, and to send a beamformed transmission to the served UE, wherein the beamformed transmission is beamformed using the selected precoder.

In an additional aspect of the disclosure, an apparatus configured for wireless communication is disclosed. The apparatus includes at least one processor, and a memory coupled to the processor. The processor is configured to detect a CSI-RS at a UE from a base station, to transmit a SRS to the base station on each of one or more receive antennas with transmission capability, to generate a channel estimate for one or more unmatched receive antennas using the CSI-RS, wherein the one or more unmatched receive antennas include a plurality of receive antennas of the UE minus the one or more receive antennas with transmission capability, to transmit the channel estimate to the base station, and to receive beamformed communications from the base station, wherein the beamformed communications are beamformed with a precoder associated with at least the channel estimate.

In an additional aspect of the disclosure, an apparatus configured for wireless communication is disclosed. The apparatus includes at least one processor, and a memory coupled to the processor. The processor is configured to detect a CSI-RS at a UE from a base station, to obtain one or more precoders based on an estimated downlink channel of one or more receive antennas with transmission capability of the UE using the CSI-RS, to select one or more additional precoders for one or more unmatched receive antennas, to combine the one or more precoders with the one or more additional precoders into a combined set of precoders, and to feed back a rank indicator and layer selection to the base station, wherein the rank indicator and layer selection are determined based on an effective channel associated with the combined set of precoders.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
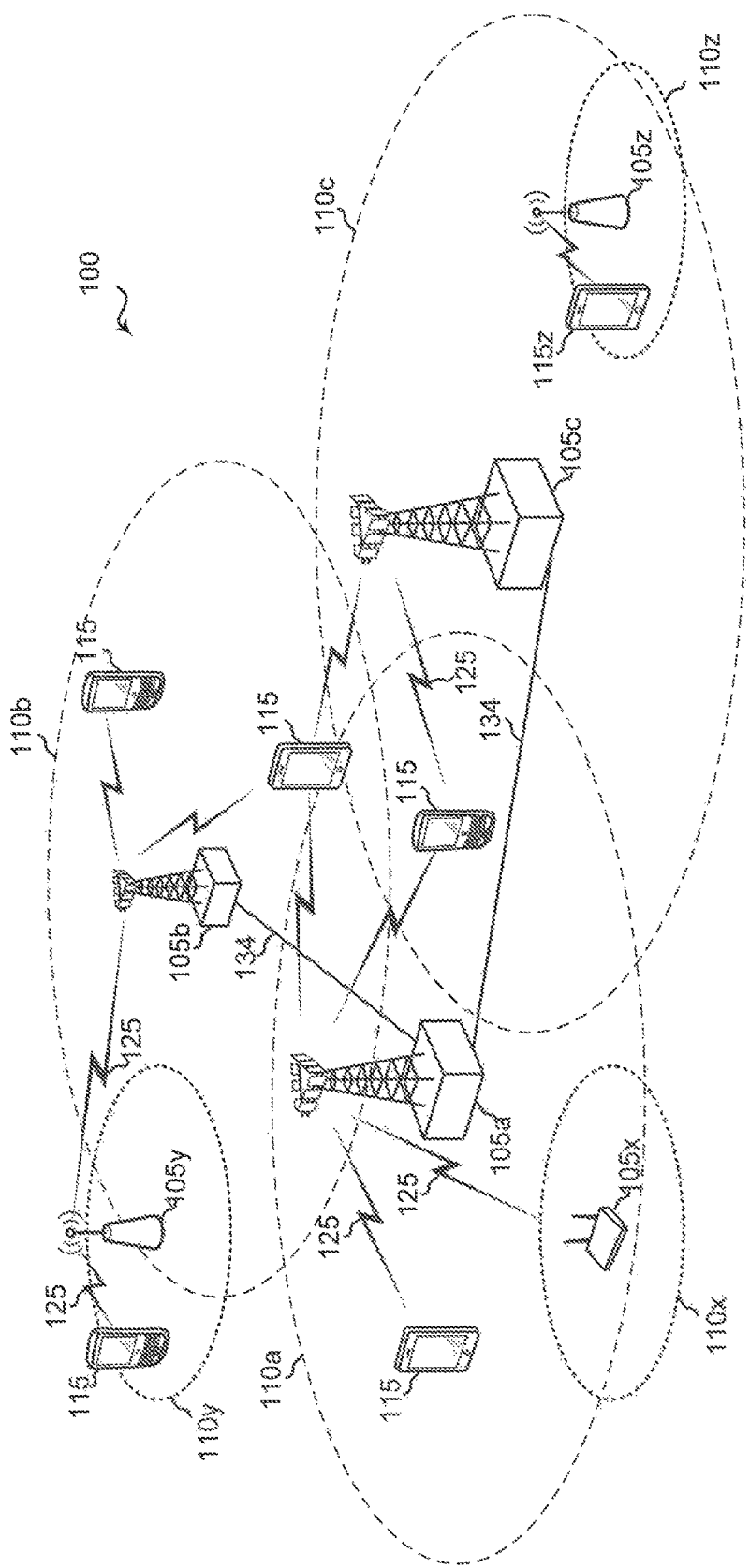
FIG. 1 is a block diagram illustrating details of a wireless communication system.

The detailed description set forth below, in connection with the appended drawings and appendix, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. For clarity, certain aspects of the apparatus and techniques may be described below for LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

A new carrier type based on LTE/LTE-A including unlicensed spectrum has also been suggested that can be compatible with carrier-grade WiFi, making LTE/LTE-A with unlicensed spectrum an alternative to WiFi. LTE/LTE-A, when operating in unlicensed spectrum, may leverage LTE concepts and may introduce some modifications to physical layer (PHY) and media access control (MAC) aspects of the network or network devices to provide efficient operation in the unlicensed spectrum and meet regulatory requirements. The unlicensed spectrum used may range from as low as several hundred Megahertz (MHz) to as high as tens of Gigahertz (GHz), for example. In operation, such LTE/LTE-A networks may operate with any combination of licensed or unlicensed spectrum depending on loading and availability. Accordingly, it may be apparent to one of skill in the art that the systems, apparatus and methods described herein may be applied to other communications systems and applications.

System designs may support various time-frequency reference signals for the downlink and uplink to facilitate beamforming and other functions. A reference signal is a signal generated based on known data and may also be referred to as a pilot, preamble, training signal, sounding signal, and the like. A reference signal may be used by a receiver for various purposes such as channel estimation, coherent demodulation, channel quality measurement, signal strength measurement, and the like. MIMO systems using multiple antennas generally provide for coordination of sending of reference signals between antennas; however, LTE systems do not in general provide for coordination of sending of reference signals from multiple base stations or eNBs.

In some implementations, a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. Reciprocity may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In LTE implementations, orthogonal frequency division multiplexing (OFDM) is used for the downlink—that is, from a base station, access point or eNodeB (eNB) to a user terminal or UE. Use of OFDM meets the LTE requirement for spectrum flexibility and enables cost-efficient solutions for very wide carriers with high peak rates, and is a well-established technology. For example, OFDM is used in standards such as IEEE 802.11a/g, 802.16, High Performance Radio LAN-2 (HIPERLAN-2, wherein LAN stands for Local Area Network) standardized by the European Telecommunications Standards Institute (ETSI), Digital Video Broadcasting (DVB) published by the Joint Technical Committee of ETSI, and other standards.

Time frequency physical resource blocks (also denoted here in as resource blocks or "RBs" for brevity) may be defined in OFDM systems as groups of transport carriers (e.g. sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot. Additional details of LTE RBs and REs are described in the 3GPP specifications, such as, for example, 3GPP TS 36.211.

UMTS LTE supports scalable carrier bandwidths from 20 MHz down to 1.4 MHZ. In LTE, an RB is defined as 12 sub-carriers when the subcarrier bandwidth is 15 kHz, or 24 sub-carriers when the sub-carrier bandwidth is 7.5 kHz. In an exemplary implementation, in the time domain there is a defined radio frame that is 10 ms long and consists of 10 subframes of 1 millisecond (ms) each. Every subframe consists of 2 slots, where each slot is 0.5 ms. The subcarrier spacing in the frequency domain in this case is 15 kHz.

Twelve of these subcarriers together (per slot) constitute an RB, so in this implementation one resource block is 180 kHz. Six Resource blocks fit in a carrier of 1.4 MHz and 100 resource blocks fit in a carrier of 20 MHz.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 shows a wireless network 100 for communication, which may be an LTE-A network. The wireless network 100 includes a number of evolved node Bs (eNBs) 105 and other network entities. An eNB may be a station that communicates with the UEs and may also be referred to as a base station, a node B, an access point, and the like. Each eNB 105 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. In the example shown in FIG. 1, the eNBs 105a, 105b and 105c are macro eNBs for the macro cells 110a, 110b and 110c, respectively. The eNBs 105x, 105y, and 105z are small cell eNBs, which may include pico or femto eNBs that provide service to small cells 110x, 110y, and 110z, respectively. An eNB may support one or multiple (e.g., two, three, four, and the like) cells.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In FIG. 1, a lightning bolt (e.g., communication links 125) indicates wireless transmissions between a UE and a serving eNB, which is an eNB designated to serve the UE on the downlink and/or uplink, or desired transmission between eNBs. Wired backhaul communication 134 indicate wired backhaul communications that may occur between eNBs.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

Figure 2:
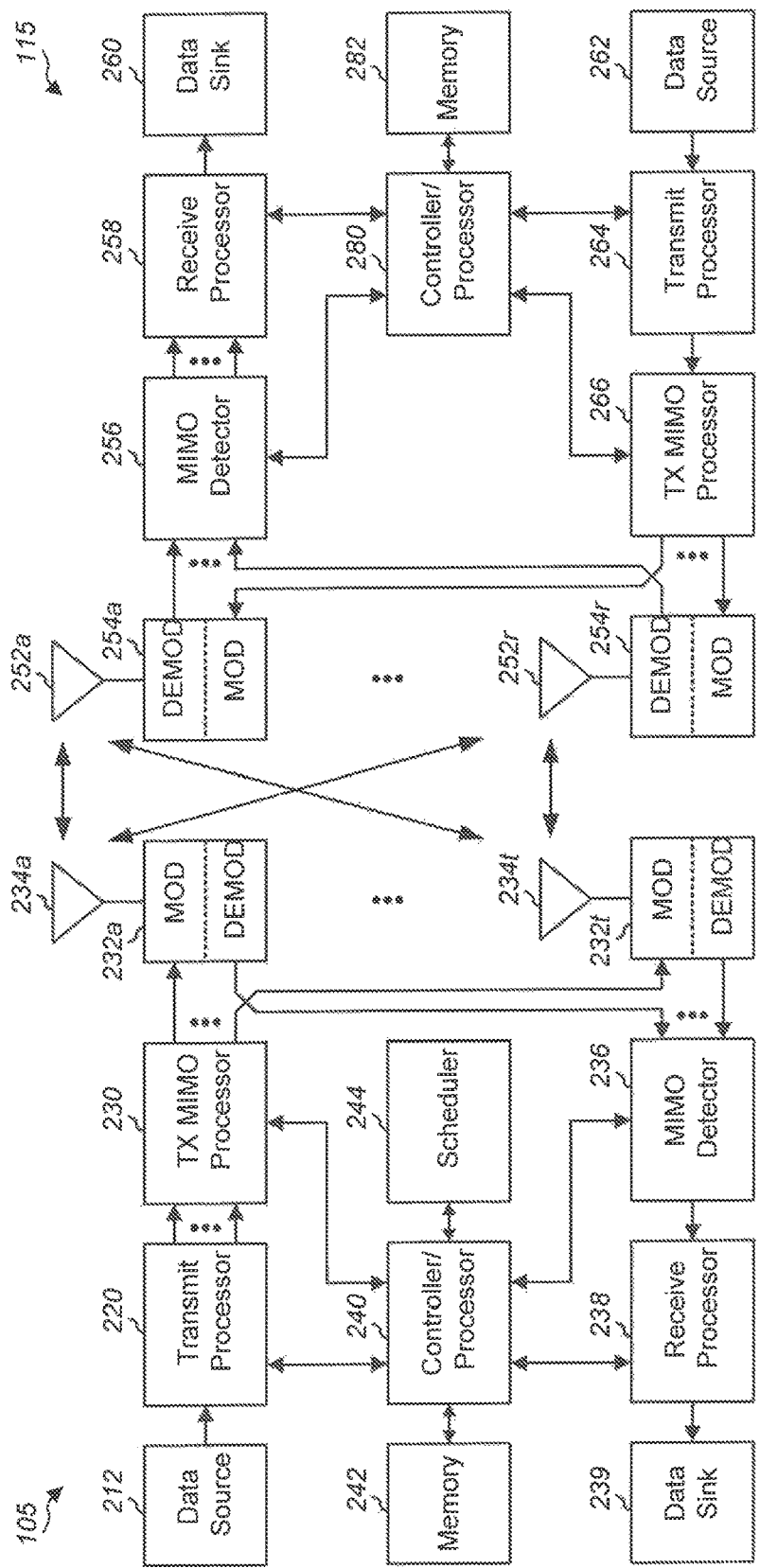
FIG. 2 is a block diagram conceptually illustrating a design of a base station/eNB and a UE configured according to one aspect of the present disclosure.

FIG. 2 shows a block diagram of a design of a base station/eNB 105 and a UE 115, which may be one of the base stations/eNBs and one of the UEs in FIG. 1. For a restricted association scenario, the eNB 105 may be the small cell eNB 105z in FIG. 1, and the UE 115 may be the UE 115z, which in order to access small cell eNB 105z, would be included in a list of accessible UEs for small cell eNB 105z. The eNB 105 may also be a base station of some other type. The eNB 105 may be equipped with antennas 234a through 234t, and the UE 115 may be equipped with antennas 252a through 252r.

At the eNB 105, a transmit processor 220 may receive data from a data source 212 and control information from a controller/processor 240. The control information may be for the PBCH, PCFICH, PHICH, PDCCH, etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the eNB 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the eNB 105. At the eNB 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the eNB 105 and the UE 115, respectively. The controller/processor 240 and/or other processors and modules at the eNB 105 may perform or direct the execution of various processes for the techniques described herein. The controllers/processor 280 and/or other processors and modules at the UE 115 may also perform or direct the execution of the functional blocks illustrated in FIGS. 4, 5A, 5B, 6, 7, 8A, and 8B, and/or other processes for the techniques described herein. The memories 242 and 282 may store data and program codes for the eNB 105 and the UE 115, respectively. A scheduler 244 may schedule UEs for data transmission on the downlink and/or uplink.

In frequency division duplex (FDD) systems, transmitter precoding/beamforming relies on channel feedback from a receiver to determine the channel estimate and select the appropriate precoders for beamforming. In time divisional duplex (TDD) systems, channel reciprocity can be exploited by a transmitter to obtain channel information from a received communication to perform transmission beamforming. However, in an asymmetric antenna configuration, where there are a fewer number of transmission chains or transmit antennas, t, than the number of receive antennas or receive chains, r, at a given UE, an eNB can obtain a downlink channel estimate on the t receive antennas that are symmetrically matched with the t transmit antennas with channel reciprocity but not on the unmatched r–t receive antennas. For example, a UE may transmit sounding reference signals (SRS) on each of the t transmit antennas on the uplink. The eNB may use the SRS to generate a downlink channel estimate, as the uplink and downlink for a matched transmit/receive antenna are on the same channel in TDD. Thus, the eNB may determine the downlink channel for the t transmit channels without knowledge of the remaining r–t channels.

Figure 3:
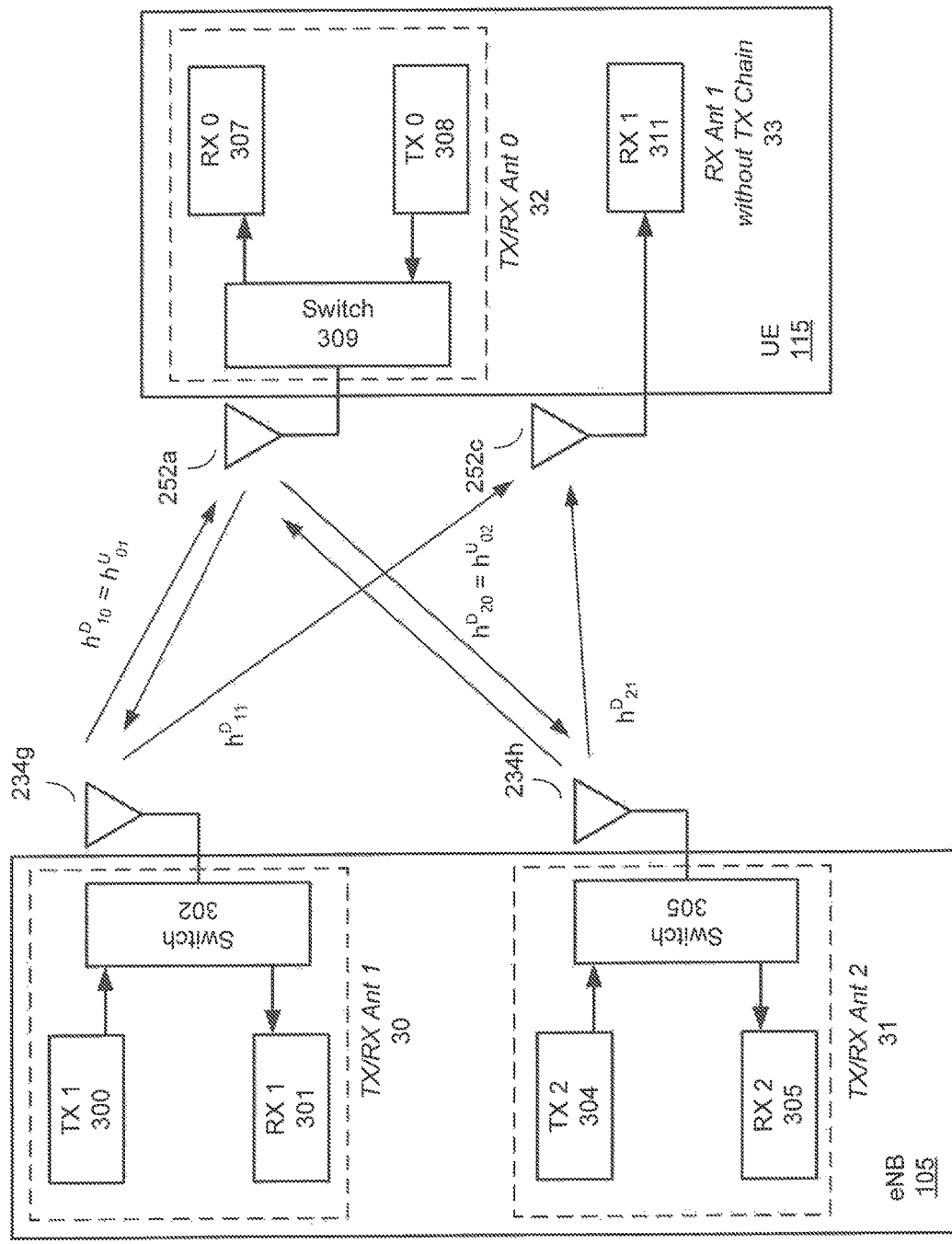
FIG. 3 is a block diagram illustrating a UE having an asymmetric transmit/receive chain.

FIG. 3 is a block diagram illustrating a UE 115 having an asymmetric transmit/receive chain. UE 115 includes TX/RX antenna 0-32 which forms the basis of both the transmit chain and receive chain of UE 115. By activating switch 309, UE 115 may switch between a receiving chain of antenna 252a and receiver 0-307 to receive transmissions and a transmit chain of antenna 252a and transmitter 0 to transmit signals. UE 115 also includes receive antenna 1-33 that operates a receive chain with receiver 1-311 and antenna 252c, without a matching transmit chain. UE 115 is in communication with eNB 105. eNB 105 includes at least two receive/transmit chains, TX/RX antenna 1-30 and TX/RX antenna 2-31. Using switches 302 and 305, eNB 105 may switch between transmit chains with transmitter 1-300 and antenna 234g and transmitter 2-304 and antenna 234h, and receive chains with receiver 1-301 and antenna 234g and receiver 2-305 and antenna 234h.

In a TDD system, the uplink and downlink transmissions received by each of TX/RX antenna 0-32, TX/RX antenna 1-30, and TX/RX antenna 2-31 are transmitted over the same channel, but at different times. The uplink and downlink channels between TX/RX antenna 1-30 of eNB 105 and TX/RX antenna 0-32 of UE 115 would be represented by $h^D_{10} = h^U_{01}$, and between TX/RX antenna 2-31 and TX/RX antenna 0-32 would be represented by $h^D_{10} = h^U_{01}$, where h is the channel equation, D represents downlink, U represents uplink, and the subscript represents identification of the antenna to antenna direction. The downlink channels between UE 115 and RX antenna 1-33 would be represented by $h^D_{11}$ and $h^D_{21}$, respectively. Without a matching transmit chain, RX antenna 1-33 may receive transmissions without transmitting. Various aspects of the present disclosure are directed to accommodating for unmatched receive antennas when determining channel estimations for beamforming.

Figure 4:
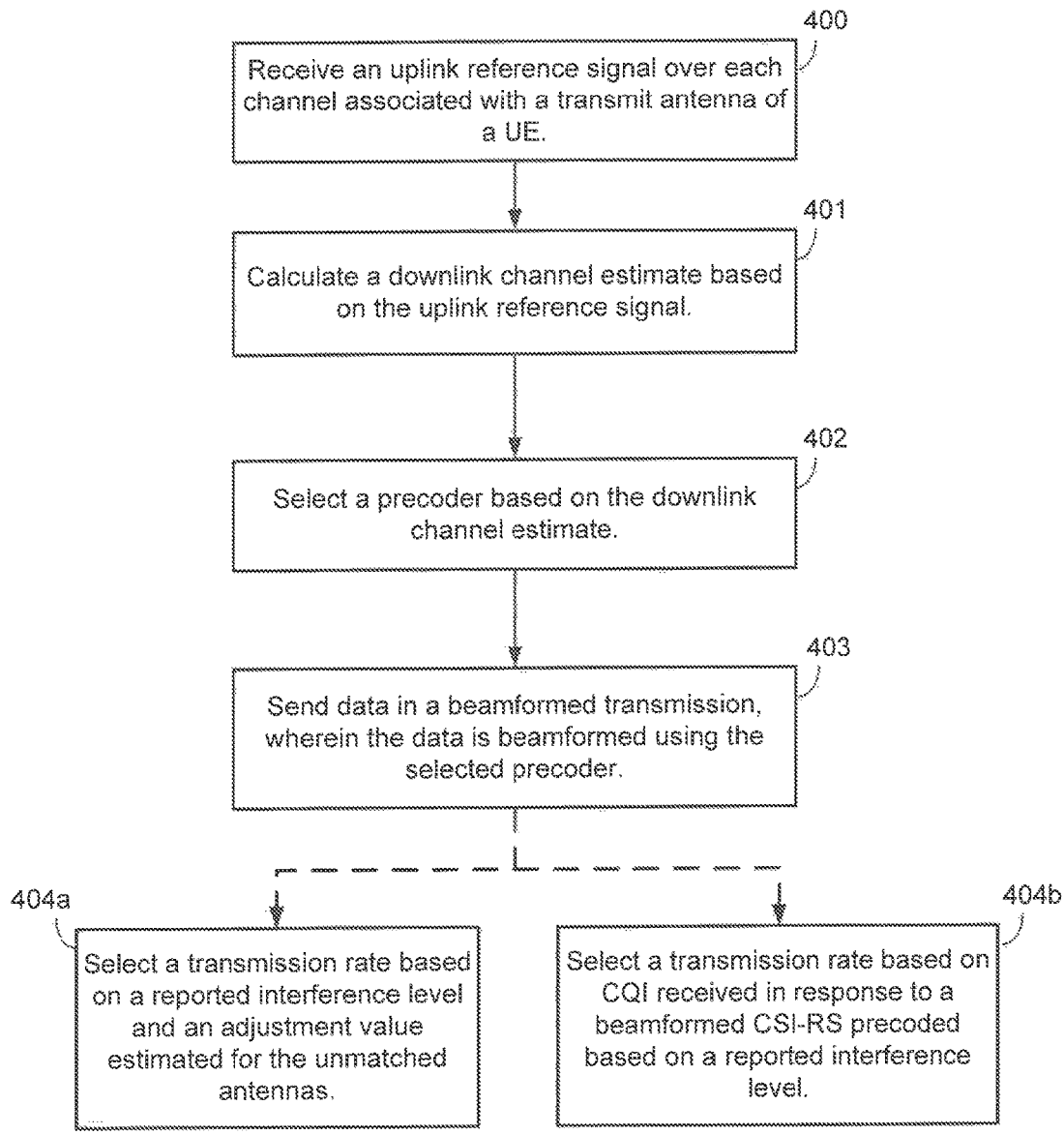
FIG. 4 is a block diagram illustrating example blocks executed to implement one aspect of the present disclosure.
Figure 10:
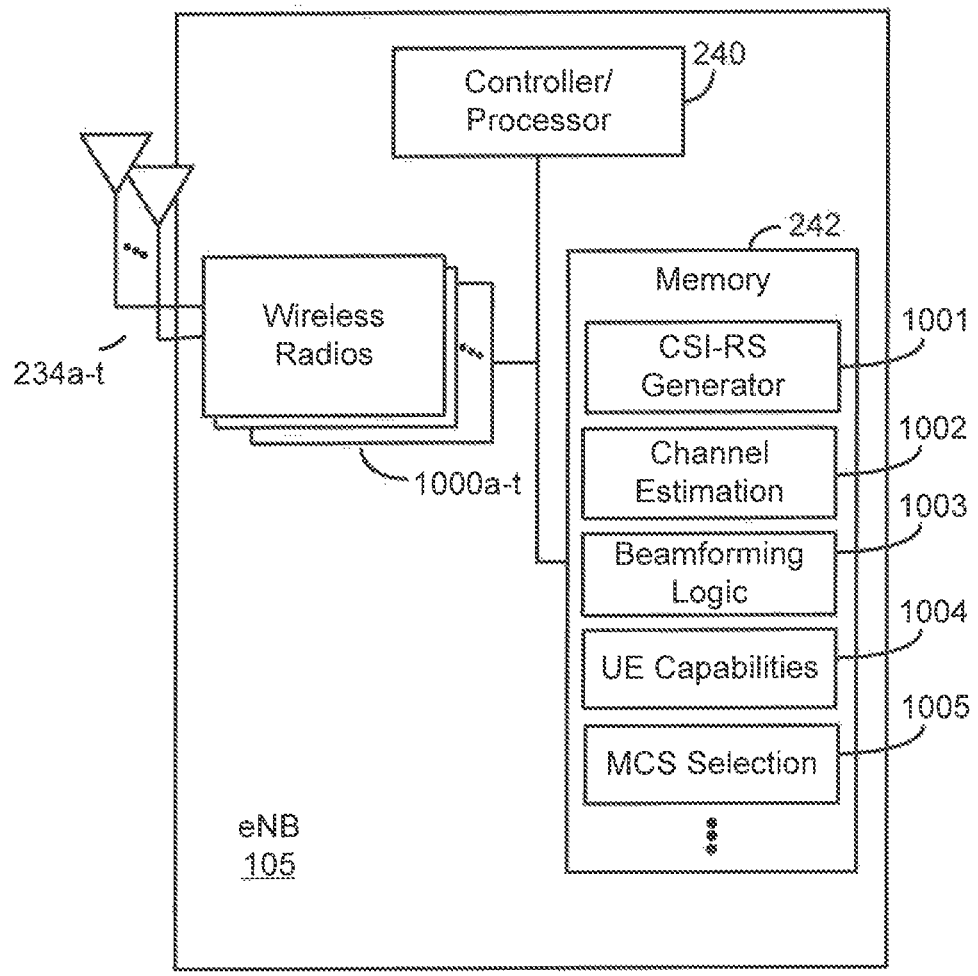
FIG. 10 is a block diagram illustrating an eNB configured according to one aspect of the present disclosure.

FIG. 4 is a block diagram illustrating example blocks executed to implement one aspect of the present disclosure. The example aspect provide a first option for handling the asymmetric antenna configuration of the served UE. The example blocks will also be described with respect to eNB 105 as illustrated in FIG. 10. FIG. 10 is a block diagram illustrating eNB 105 configured according to one aspect of the present disclosure. eNB 105 includes the structure, hardware, and components as illustrated for eNB 105 of FIG. 2. For example, eNB 105 includes controller/processor 240, which operates to execute logic or computer instructions stored in memory 242, as well as controlling the components of eNB 105 that provide the features and functionality of eNB 105. eNB 105, under control of controller/processor 240, transmits and receives signals via wireless radios 1000a-t and antennas 234a-t. Wireless radios 1000a-t includes various components and hardware, as illustrated in FIG. 2 for eNB 105, including modulator/demodulators 232a-t, MIMO detector 236, receive processor 238, transmit processor 220, and TX MIMO processor 230.

At block 400, a base station receives an uplink reference signal over each channel associated with a transmit antenna of a UE. For example, an eNB may receive SRS transmitted form a served UE via antennas 234a-t and wireless radios 1000a-t, under control of controller/processor 240.

At block 401, the base station calculates a downlink channel estimate based on the uplink reference signal. For example, controller/processor 240 of eNB 105 executes channel estimation logic 1002 stored in memory 242. The execution environment of channel estimation logic 1002 calculates a downlink channel estimate using uplink reference signals, such as SRS signals received from the served UE. While providing SRS on the uplink channel, because the base station of the present example operates in a TDD MIMO system, the uplink and downlink from the UE share the same channel. Thus, the execution environment of channel estimation logic 1002 estimating the channel based on SRS may yield an accurate channel estimation on the downlink channel to the UE's matched receive antenna due to channel reciprocity.

At block 402, the base station selects a precoder based on the downlink channel estimate. For example, controller/processor 240 executes beamforming logic 1003 stored in memory 242. The execution environment of beamforming logic 1003 allows eNB 105, under control of controller/processor 240 to control the components of eNB 105 and execute the functionality to beamform the transmissions. The served UE does not transmit explicit channel feedback on unmatched receive antennas which cannot be sounded in uplink. eNB 105, thus, performs the beamforming with beamforming logic 1003 based on the channel available from uplink SRS. The additional unmatched UE receive antennas, which cannot be sounded, may be used for diversity reception or other cell interference rejection.

Beamforming, according to the execution environment of beamforming logic 1003, by an eNB, such as eNB 105, is determined by channel estimation between the eNB transmit antennas and the receive antennas of the UE. In general, beamforming begins with the following relationship:

$$H = \begin{bmatrix} H_{10} & H_{20} \\ H_{11} & H_{21} \end{bmatrix} \quad (1)$$

Where H is the channel estimate for the entire communication channel. Under the asymmetric unmatched antenna configuration, $H_{11}$ and $H_{21}$, the channels between TX/RX antenna 1-30 (FIG. 3) and RX antenna 1-33 ($H_{11}$) and TX/RX antenna 2-31 and RX antenna 1-33 ($H_{21}$) are unknown at the eNB. eNB 105 performs beamforming according to beamforming logic 1003 based on $H_0 = [H_{10} \ H_{20}]$.

In an additional aspect, the eNB may receive transmit and receive antenna capabilities from the served UE. The eNB may select the precoder further based on the received transmit and receive antenna capabilities. For example, if the served UE indicates that it has a lot more receive antennas than transmit antennas, the eNB may configure the served UE to send an explicit CSI feedback and select the precoder accordingly. If the served UE indicates that it has symmetric antenna configuration, the eNB may select the precoder based on channel reciprocity. If the served UE indicates that it has more receive antennas than transmit antennas (but the number of receive antennas is close to the number of transmit antennas), the eNB may choose to do pseudo orthogonal beamforming or select the precoder based on the subset of antennas which have both transmit and receive capabilities.

At block 403, the eNB sends data in a beamformed transmission, wherein the data is beamformed using the selected precoder. For example, under control of controller/processor 204, once the beamforming or precoding of the data is completed with beamforming logic 1003, eNB 105 transmits the beamformed data via wireless radios 1000a-t and antennas 234a-t. The beamformed transmitted signal becomes:

$$Y = H_{eNB} H_0^* X + N = \begin{bmatrix} H_{10} & H_{20} \\ H_{11} & H_{21} \end{bmatrix} [H_{10} \ H_{20}]^H X + N, \quad (2)$$

i.e., $$y_0 = (|H_{10}|^2 + |H_{20}|^2)X + N_1, \text{ and} \quad (3)$$

$$y_1 = (H_{11}H_{10}^* + H_{21}H_{20}^*)X + N_2. \quad (4)$$

At the UE, the signal received on first matched receive antenna with transmit capability benefits from the beamforming at eNB 105. The UE would then combine $y_0$ and $y_1$ for demodulation.

Selection of the transmission rate for downlink transmission scheduling, eNB 105, under control of controller/processor 240, executes modulation coding scheme (MCS) selection logic 1005 stored in memory 242. The execution environment of MCS selection logic 1005 may use various options means for selecting the MCS or transmission rate for downlink transmissions. In determining the transmission rate for downlink scheduling, two alternative options are available to MCS selection logic 1005 of eNB 105. In a first option, at block 404a, eNB 105 selects a transmission rate based on a reported interference level and an adjustment value estimated for the unmatched receive antennas. The interference level is reported from UE to eNB 105. Since eNB 105 is not aware of the channel state information on the unmatched r–t antennas, which cannot be sounded, eNB 105 could derive the transmission rate, e.g., the MCS, based on the first t antennas and add an adjustment value to the interference level, as the eNB is aware of the presence of r total receive antennas on the UE from a capability report received from the UE. It should be noted that any MCS inaccuracy due to the incomplete view of the channel and unprecise estimate of the adjustment value may be handled by an outer loop convergence mechanism.

In a second option for MCS selection logic 1005, at block 404b, eNB 105 selects a transmission rate based on a CQI received in response to a beamformed CSI-RS precoded based on a reported interference level. The UE feeds back a coarse interference covariance matrix, Rnn, for beamforming selection by eNB 105. eNB 105 determines beamforming, through execution of beamforming logic 1003 by controller/processor 240, and then executes CSI-RS generator 1001, stored in memory 242, to send a precoded CSI-RS based on the first t antennas, representative of the t transmit antennas. The CQI reported by the UE within the operation of block 404b is based on the precoded CSI-RS and takes the additional receive antennas into account in the calculation.

In the operation of the aspects described with respect to FIG. 4, the eNB, such as eNB 105, does not need to transmit downlink reference signal (e.g., CSI-RS) consistently for UE to measure the downlink channel. Moreover, the UE would not need to feed back the channel which cannot be sounded in uplink. Therefore, downlink and uplink overhead are minimized in the described aspect.

It should be noted that in a CoMP scenario, where multiple UEs could be scheduled in a CoMP cluster, the described aspects of FIG. 4 may be beneficial for the eNB to schedule data streams to a UE with the available channel information instead of sending more data streams to a UE with the non-optimized beam. The additional space can be used to schedule other UEs on the same time and frequency resources. Despite these advantages, the rank may be limited based on t, transmit antennas rather than the total receive antennas or receive chains, r.

Figures 5A, 5B:
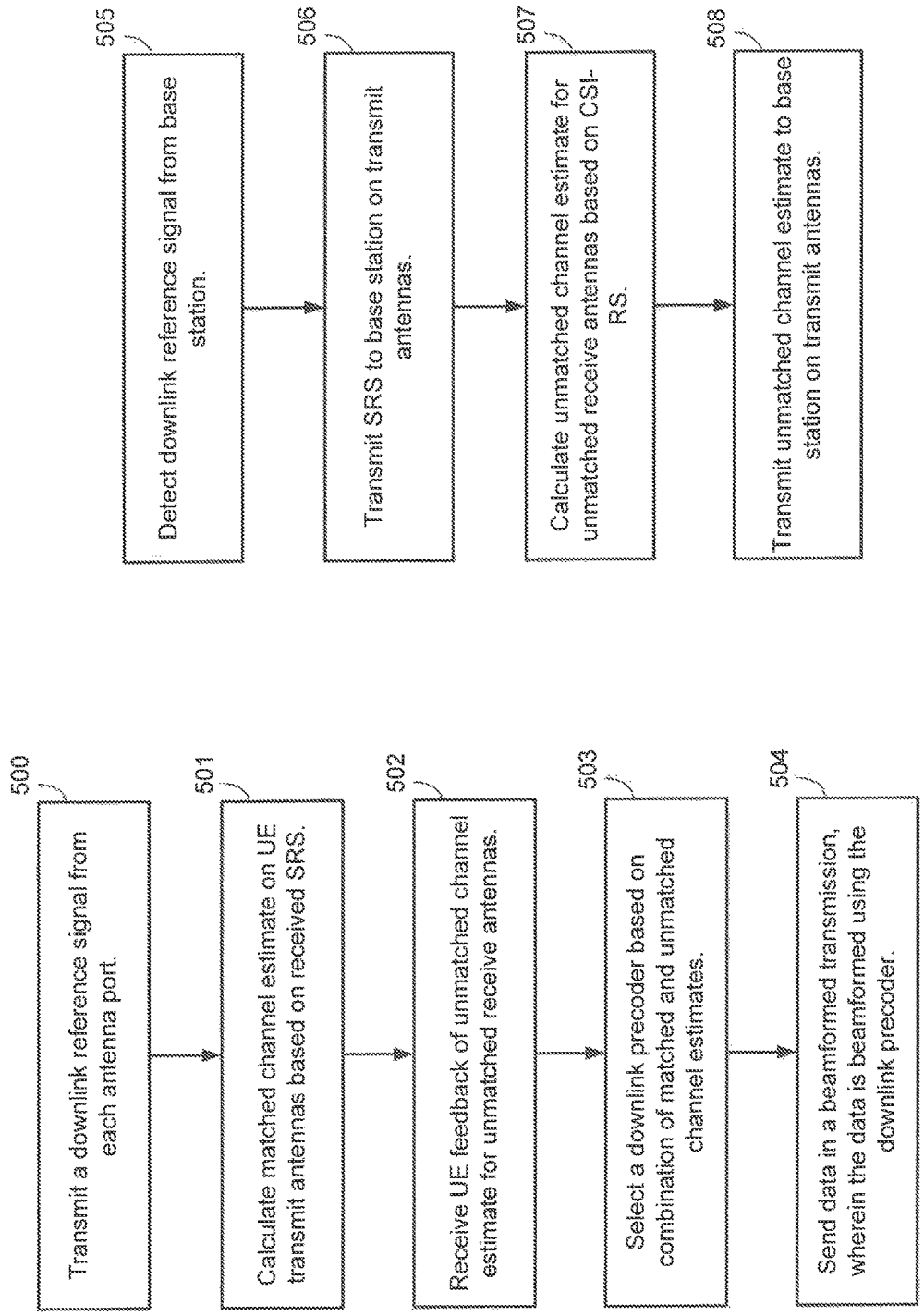
FIGS. 5A and 5B are block diagrams illustrating example blocks executed at an eNB and UE to implement one aspect of the present disclosure.
Figure 11:
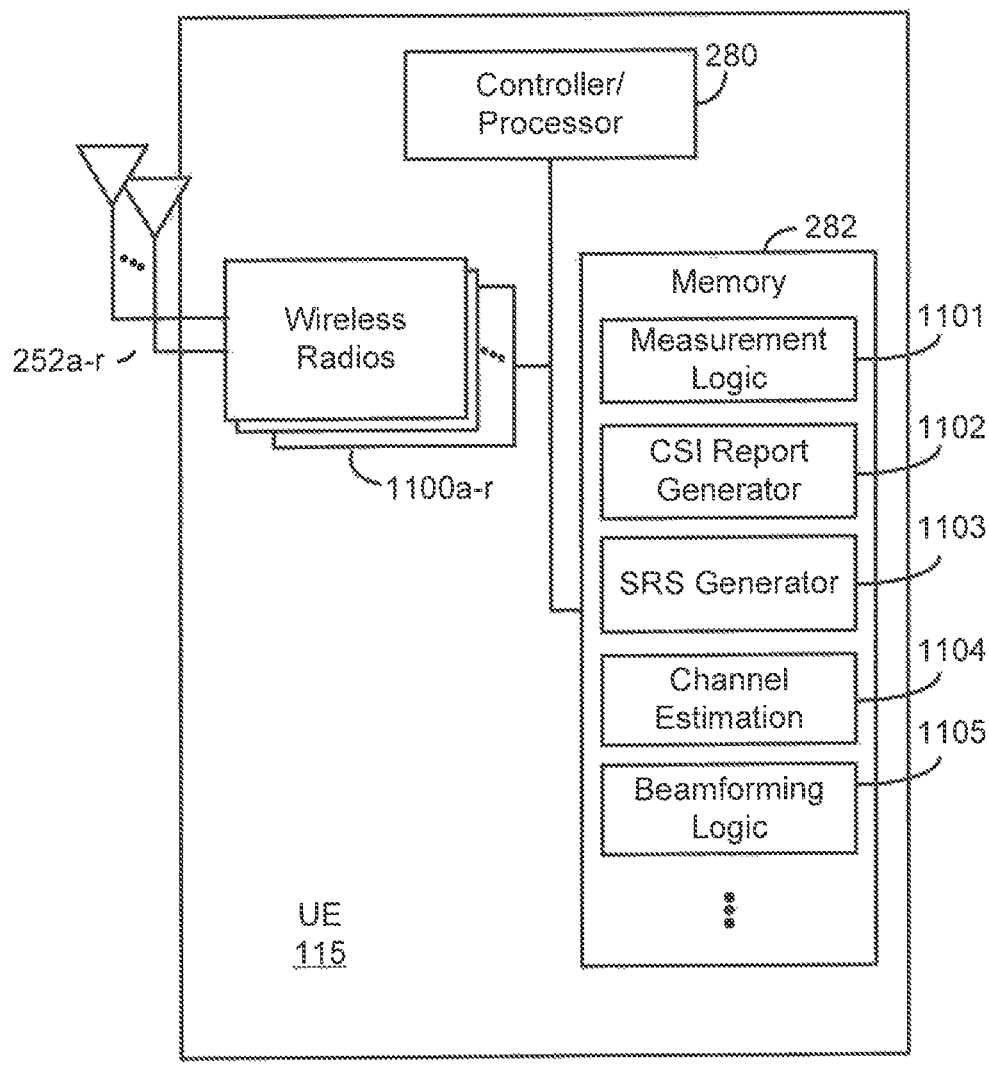
FIG. 11 is a block diagram illustrating a UE configured according to one aspect of the present disclosure.

FIGS. 5A and 5B are block diagrams illustrating example blocks executed at an eNB and UE to implement one aspect of the present disclosure. The example blocks will also be described with respect to eNB 105 as illustrated in FIG. 10 and with respect to UE 115 as illustrated in FIG. 11. FIG. 11 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1100a-r and antennas 252a-r. Wireless radios 1100a-r includes various components and hardware, as illustrated in FIG. 2 for UE 115, including modulator/demodulators 254a-r, MIMO detector 256, receive processor 258, transmit processor 264, and TX MIMO processor 266.

At block 500, an eNB transmits a downlink reference signal from each transmit antenna port. For example, eNB 105, under control of controller/processor 240, executes CSI-RS generator 1001 to generate a CSI-RS that is then transmitted from eNB 105 via wireless radios 1000a-t and antennas 234a-t, under control of controller/processor 240. The downlink reference signals (e.g., CSI-RS) are transmitted from eNB 105 to a served UE, such as UE 115. At block 505, the UE detects the downlink reference signal from the base station. For example, UE 115, under control of controller/processor 280, receives the downlink reference signals vial antennas 252a-r and wireless radios 1100a-r, and detects CSI-RS within the received signals.

At block 506, the UE transmits SRS on the transmit antennas. For example, UE 115, under control of controller/processor 280, executes SRS generator 1103, which generates a sounding one for transmission via wireless radios 1100a-r and antennas 252a-r. At block 501, the eNB calculates a matched channel estimate on the UE transmit antennas based on the received SRS. For example, eNB 105 receives the SRS via antennas 234a-t and wireless radios 1000a-t and executes channel estimation logic 1002, under control of controller/processor 240 to calculate a channel estimate on the matched receive antennas based on channel reciprocity.

At block 507, the UE calculates the unmatched channel estimate for the unmatched receive antennas based on the CSI-RS. For example, UE 115, under control of controller/processor 280, executes channel estimation logic 1104 to calculate the channel estimate for the unmatched receive antennas based on the CSI-RS received through antennas 252a-r and wireless radios 1100a-r. At block 508, the UE transmits the unmatched channel estimate to the base station on the transmit antennas. Antennas 252a-r and wireless radios 1100a-r include both matched receive chains with both receiver and transmitter capabilities and unmatched receive chains having only receiver capabilities. UE 115 feeds back the estimated channel on the unmatched, r–t, receive antennas without transmit capability via the transmit antennas of antennas 252a-r and wireless radios 1100a-r. For purposes of the described aspect, UE 115 is assumed to be equipped with r receive antennas, in which the first t antennas are symmetrically matched and able to transmit.

At block 502, the eNB receives the UE feedback of the unmatched channel estimate for unmatched receive antennas. For example, eNB 105 receives the UE feedback of the unmatched channel estimate via antennas 234a-t and wireless radios 1000a-t. At block 503, the eNB selects a downlink precoder based on the combination of the matched and unmatched channel estimates. eNB 105 executes beamforming logic 1003 to select the downlink precoder based on the combined channel estimate. Since UE side calibration plays a negligible impact on downlink beamforming, channel estimation based on channel reciprocity and explicit feedback can be used without any further scaling. At block 504, the eNB sends data in a beamformed transmission, wherein the data is beamformed using the downlink precoder. eNB 105, through the execution environment of beamforming logic 1003 precodes data for transmission and, under control of controller/processor 240, transmits the precoded/beamformed data via wireless radios 1000a-t and antennas 234a-t.

In operation of the aspects described with respect to FIGS. 5A and 5B, the eNB obtains full channel knowledge which will result in more accurate transmission beamforming. However, because of the additional information, the eNB would transmit reference signals (CSI-RS) more consistently and regularly from all transmit antennas to enable the UE to measure the downlink channel. Conversely, the UE would report the downlink channel estimates for the unmatched receive channels/antennas, which cannot be sounded in uplink. Therefore, the overhead for both downlink and uplink is increased by the described aspect.

Figure 6:
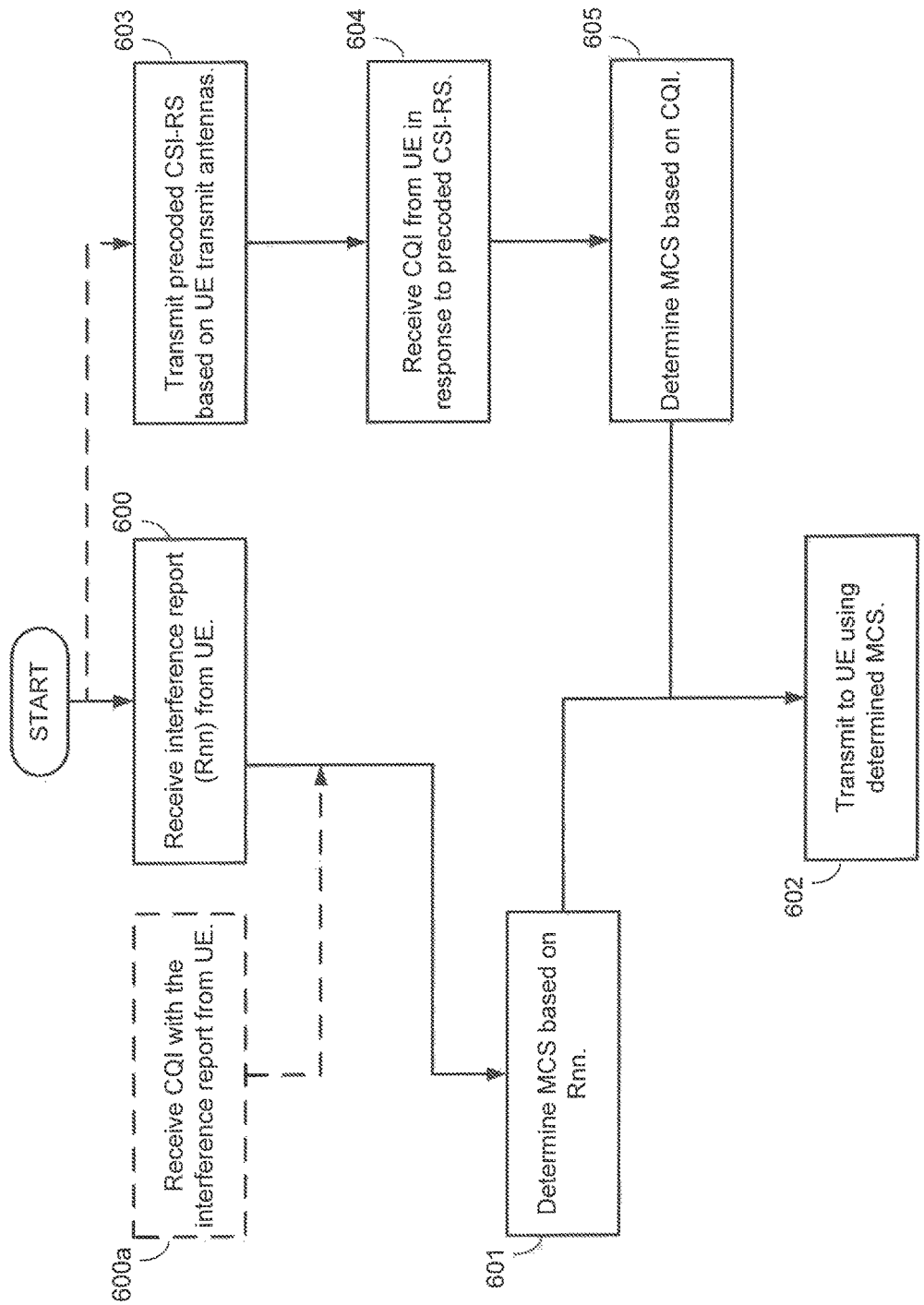
FIG. 6 is a block diagram illustrating example blocks executed to implement one aspect of the present disclosure.

FIG. 6 is a block diagram illustrating example blocks executed to implement one aspect of the present disclosure. The aspect described in FIG. 6 provides alternative operations for an eNB, such as eNB 105, to select a transmission rate (e.g., a MCS) for communications with served UEs. The various operations illustrated in FIG. 6 may be implemented within the execution environment of MCS selection logic 1005, under control of controller/processor 240. At block 600, the eNB receives an interference report (e.g., coarse interference covariance matrix, Rnn, or interference report identifying an interference level associated with at least the receive antennas, r, or the transmit antennas, t) from a served UE. eNB 105 receives the interference report from the served UE through antennas 234a-t and wireless radios 1000a-t. At block 601, the eNB determines the MCS based on the Rnn and, at block 602, transmits communications to the UE using the determined MCS. Within the execution environment of MCS selection logic 1005, eNB 105 uses the Rnn to determine the appropriate MCS and then transmits data to the served UE using the determined MCS.

It should be noted that, with an Rnn-based approach to determining MCS, the UE receiver antenna gain imbalance may adversely affect the accuracy of MCS. The amount of impact will depend on the imbalance value. In order to reduce the MCS inaccuracy, an alternative aspect provides, as block 600a for eNB 105 to receive CQI feedback together with Rnn from the UE. The UE, such as UE 115, could derive the CQI based on UE measured channel on the downlink via CSI-RS and Rnn assuming that the UE and the eNB use the same algorithm for beamforming. For example, UE 115 executes measurement logic 1101 to measure the quality parameters of the CSI-RS received via antennas 252a-r and wireless radios 1100a-r and the Rnn also calculated based on the interference covariance of other received signals.

In an alternative aspect, at block 603, the eNB transmits precoded CSI-RS based on the UE transmit antennas. Using downlink channel estimates derived based on channel reciprocity from the SRS received from the UE transmit antennas, eNB 105 executes beamforming logic 1003, under control of controller/processor 240, and CSI-RS generator 1001 to precode CSI-RS for transmission via wireless radios 1000a-t and antennas 234a-t. At block 604, the eNB receives CQI fed back from the UE in response to the CSI-RS. eNB 105 receives the CQI feedback from the served UE via antennas 234a-t and wireless radios 1000a-t. At block 605, the eNB would determine the MCS based on the CQI feedback. Within the execution environment of MCS selection logic 1005, use the CQI feedback to determine and select the appropriate MCS. At block 602, the eNB transmits communications to the UE using the determined MCS. With the selected MCS, controller/processor 240 controls the transmission rate for transmissions from eNB 105 via wireless radios 1000a-t and antennas 234a-t.

Figure 7:
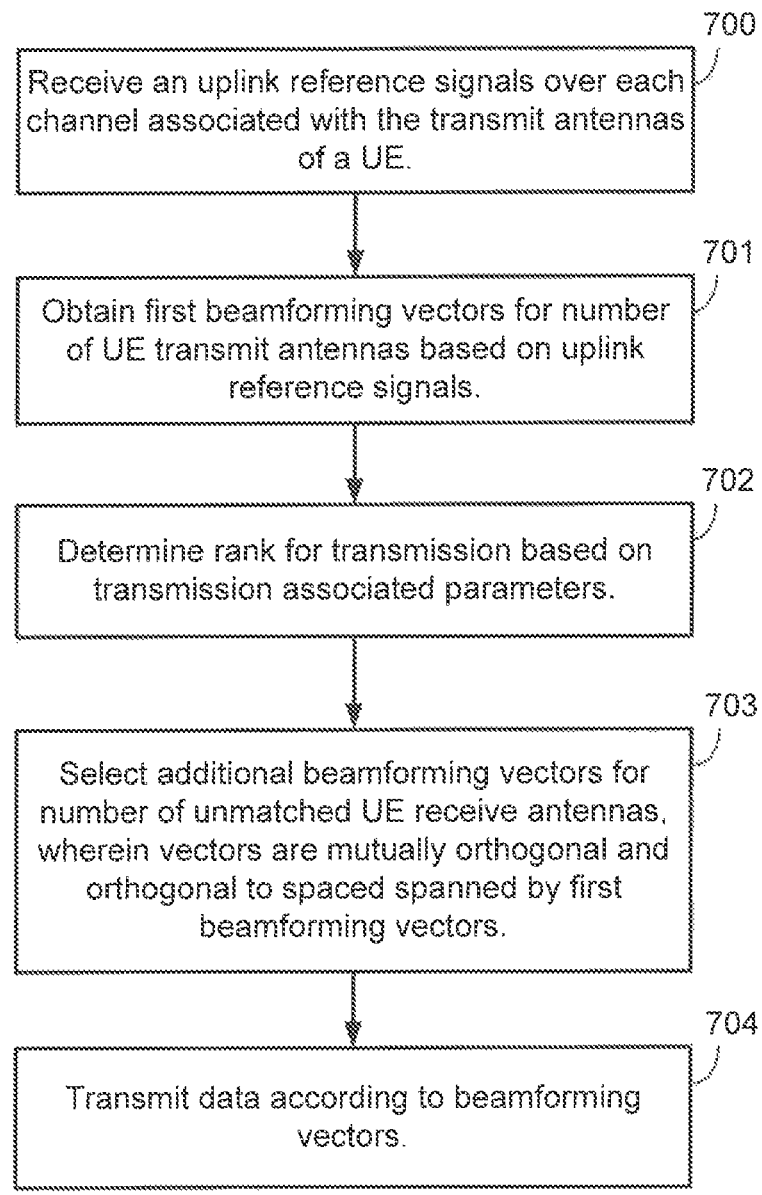
FIG. 7 is a block diagram illustrating example blocks executed to implement one aspect of the present disclosure.

FIG. 7 is a block diagram illustrating example blocks executed to implement one aspect of the present disclosure. At block 700, an eNB receives uplink reference signals over each channel associated with the transmit antennas of a UE. For example, eNB 105 receives an uplink reference signal, such as SRS, via antennas 234a-t and wireless radios 1000a-t. The uplink reference signal, or SRS, are transmission signals received at eNB 105 from the UE. At block 701, the eNB obtains first beamforming vectors for a number of UE transmit antennas based on the uplink reference signals. Based on the channel estimate of the matched receive chains using the SRS from the UE, eNB 105 executes beamforming logic 1003, under control of controller/processor 240, for selecting the first beamforming vectors for the matched receive antennas. In the described aspects of FIG. 7, the UE does not send explicit channel feedback on the unmatched received antennas which cannot be sounded in uplink. The eNB also does not transmit CSI-RS for UE to measure the channel. The eNB performs beamforming through execution of beamforming logic 1003 to obtain the precoders based on the available channel state information on the t antennas.

At block 702, the eNB determines rank for transmission based on the transmission associated parameters. For example, eNB 105, within the execution environment of MCS selection logic 1005, can determine the rank of the channel based on transmission signals, such as the Rnn report from the UE, UE geometry, antenna imbalance, antenna correlation, number of receive antennas, etc. At block 703, the eNB selects additional beamforming vectors for a number of unmatched UE receive antennas, wherein the vectors are mutually orthogonal and orthogonal to spaced spanned by the first beamforming vectors. Within the execution environment of beamforming logic 1003, eNB 105 would select the additional orthogonal beams for beamforming over both matched and unmatched channels. When the rank is greater than what can be supported with the t antennas, eNB 105 performs this pseudo beamforming by selecting the additional beams which are mutually orthogonal and orthogonal to the space spanned by the precoders based on the t antennas.

As identified above, the channel is represented by:

$$H = \begin{bmatrix} H_{10} & H_{20} \\ H_{11} & H_{21} \end{bmatrix}$$

in which $H_{11}$ and $H_{21}$ are unknown to eNB 105. eNB 105 performs beamforming based on $H_0=[H_{10}\ H_{20}]$ and obtains the first t beamforming vectors $V=[V_1, V_2, \ldots, V_t]$. In the described example, $t=1$ and $V_1=[H_{10}\ H_{20}]^H$. The eNB determines the number of streams (r) sent to the UE based on transmission signals and associated parameters, such as UE geometry, Rnn feedback, number of UE receive antennas, and the like. The eNB selects r–t vectors which are mutually orthogonal and orthogonal to the space spanned by $V=[V_1, V_2, \ldots, V_t]$. For example, $W=[V_{t+1}, \ldots, V_r]$ may be chosen as Eigen vectors of $I-V\ V^H$, where I represents the identity matrix.

MCS determination under the example aspect described with respect to FIG. 7 may also be implemented through execution of MCS selection logic 1005 using the subject matter described in FIG. 6. Since the eNB is not aware of the full channel knowledge on the UE, the eNB may utilize an outer loop mechanism to deal with the MCS inaccuracy. In the currently described aspect, the eNB can exploit full rank in the downlink channel. The eNB would not send CSI-RS consistently for the UE to measure the downlink channel. The UE would, thus, not transmit very much feedback to the eNB, reducing both downlink and uplink overhead.

FIGS. 8A and 8B are block diagrams illustrating example blocks executed at an eNB and UE to implement one aspect of the present disclosure. At block 805, an eNB transmits a downlink reference signal from each antenna port. For example, eNB 105, through controller/processor 240, executes CSI-RS generator 1001 to generate CSI-RS for each antenna port for transmission through wireless radios 1000a-t and antennas 234a-t. At block 800, the UE detects the downlink reference signal from the base station. For example, UE 115 receives and detects the CSI-RS from eNB 105 via 252a-r and wireless radios 1100a-r, under control of controller/processor 280. At block 801, the UE obtains first beamforming vectors for a number of transmit antennas based on the downlink reference signals. UE 115, under control of controller/processor 280, executes measurement logic 1101 to measure various aspects of the CSI-RS. Through further execution of channel estimation logic 1104, the measurements of the CSI-RS may be used to calculate a channel estimate based on the CSI-RS. In the described aspects of FIGS. 8A and 8B, the UE performs a beamforming operation to obtain the precoders based on the estimated downlink channel on the first t antennas which also have transmit capability. UE 115 then, under control of controller/processor 280, executes beamforming logic 1105, stored in memory 282, to select the beamforming vectors based on the selected beamforming vectors.

At block 802, the UE selects additional beamforming vectors for a number of unmatched receive antennas, wherein the vectors are mutually orthogonal and orthogonal to space spanned by the first beamforming vectors. For example, LrE 115 constructs the remaining beams via pseudo beamforming, within the execution environment of beamforming logic 1105, by selecting additional beams which are mutually orthogonal and orthogonal to the space spanned by the precoders based on the first t antennas.

At block 803, the UE determines rank and selected layers based on the effective channel. The effective channel includes the first and additional beamforming vectors for describing the entire channel. UE 115, under control of controller/processor 280 within the execution environment of beamforming logic 1105 and based on the additional information related to channel estimate and measurement information from measurement logic 1101, selects the rank and layers based on the constructed precoder and feedback to eNB.

As noted above, the channel is represented by $$H = \begin{bmatrix} H_{10} & H_{20} \\ H_{11} & H_{21} \end{bmatrix},$$

in which $H_{11}$ and $H_{21}$ are unknown at eNB. UE 115 performs beamforming based on $H_0=[H_{10} \; H_{20}]$ and obtains the first t beamforming vectors $V=[V_1, V_2, \ldots, V_t]$. In the example, t=1 and $V_1=[H_{10} \; H_{20}]^H$. The UE selects N–t vectors which are mutually orthogonal and orthogonal to the space spanned by $V=[V_1, V_2, \ldots, V_t]$ (assuming N is the maximum rank based on the number of transmit antennas on the eNB and the number of receive antennas on the UE). For example, $W=[V_{t+1}, \ldots, V_N]$ can be selected as Eigen vectors of $I-V V^H$.

It should be noted that the same construction of $W=[V_{t+1}, \ldots, V_N]$ should be used on eNB side. The UE determines rank and selected layers based on effective channel of H [V W]. The UE can assume equal power allocation and pick the column in [V W] with maximum capacity as an example.

At block 804, the UE sends transmission signals, such as an identification of the determined rank and selected layers to the base station. For example, UE 115 transmits the determined rank and selected layers as transmission signals via wireless radios 1100a-r and antennas 252a-r. At block 806, the eNB receives the transmissions signals, such as rank and selected layers from the UE. eNB 105 receives the rank and selected layers from the UE via antennas 234a-t and wireless radios 1000a-t. At block 807, the eNB constructs a set of beamforming vectors based on the transmission signals, such as the rank and selected layers. For example, eNB 105, through execution of beamforming logic 1003 and under control of controller/processor 240, constructs [V W] in the same way as the UE does. Based on the rank and selected layer report from the UE, eNB 105 derives the precoder as [V̌ W̌] by selection the corresponding column vectors from [V W]. At block 808, the eNB may transmit data according to the beamforming vectors. Controller/processor 240 of eNB 105 uses the beamforming vectors within the execution environment of beamforming logic 1003 to precode and transmit precoded data via wireless radios 1000a-t and antennas 234a-t.

Figure 8:
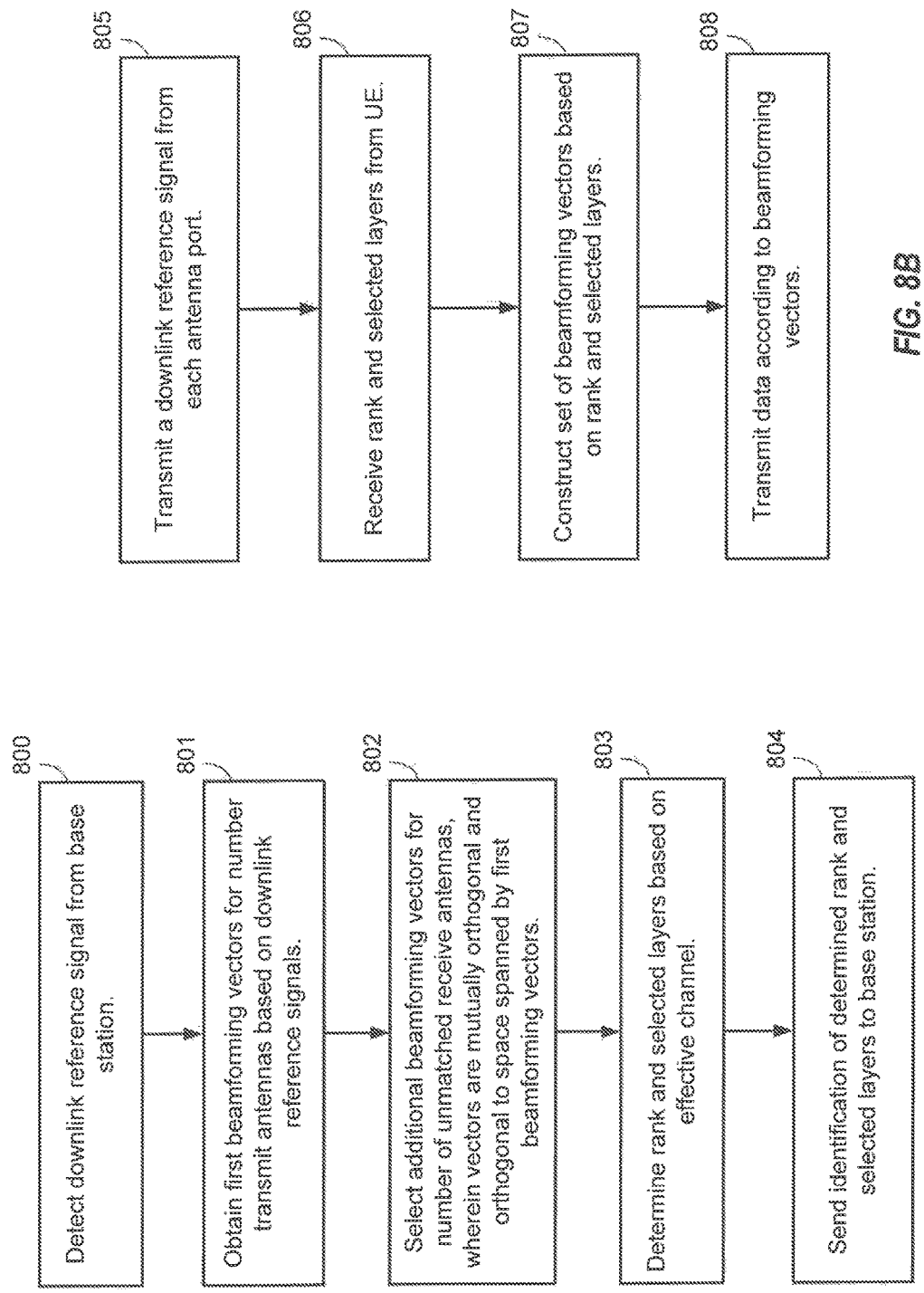
FIGS. 8A and 8B are block diagrams illustrating example blocks executed at an eNB and UE to implement one aspect of the present disclosure.

MCS determination under the example aspect described with respect to FIG. 8 may also be implemented using the subject matter described in FIG. 6. With interference covariance matrix Rnn feedback, UE can feed back MCS for each layer in addition.

In the described aspects of FIGS. 8A and 8B, the eNB can exploit full rank in the downlink channel, while the UE sends the rank and selected layer, instead of explicit feedback to the unmatched channel. It only needs to feedback rank and the selected layer. The uplink overhead is manageable.

Figure 9:
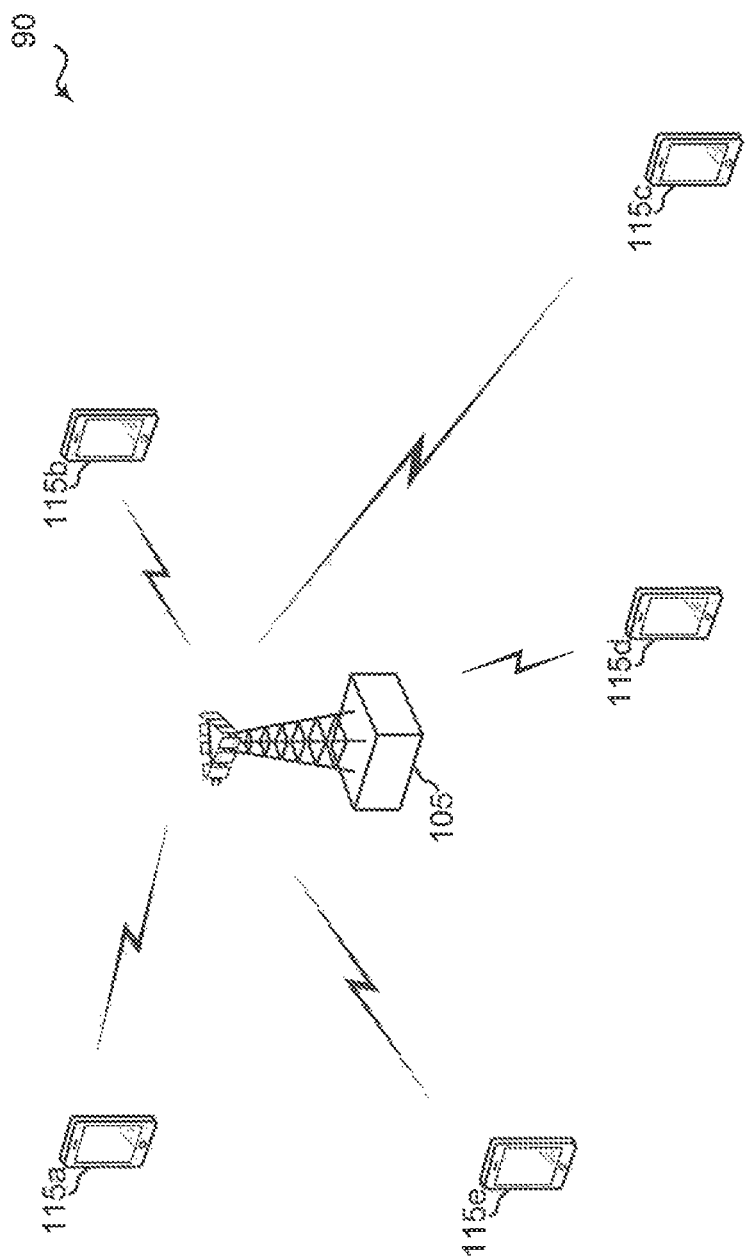
FIG. 9 is a block diagram illustrating an eNB and UEs configured according to one aspect of the present disclosure.

FIG. 9 is a block diagram illustrating an eNB 105 and UEs 115a-115e configured according to one aspect of the present disclosure. When a UE, such as UE 115c, has considerably more receive antennas than the transmit antennas (e.g., r>>t), estimation of the downlink channel based on uplink sounding may not be practical. It either requires extensive uplink feedback overhead or the performance may not be optimal. In this example aspect, communications between eNB 105 and UE 115c falls back to the traditional UE CSI feedback without relying on channel reciprocity. In such aspects, eNB 105 sends CSI-RS and UE 115c reports CSI (RI, PMI, CQI, etc) accordingly. The CSI report will be based on a codebook.

In additional example aspects, when some UEs, such as UEs 115b and 115e have symmetric Tx/Rx capability while others, such as UE 115a, 115c, and 115d have asymmetric antennas capabilities, UEs can feedback the antenna capabilities to eNB 105 and eNB 105 stores the capabilities of each of the served UEs in memory 242 at UE capabilities 1004. By accessing the various UE capabilities, eNB 105 may schedule the symmetric UEs, UEs 115b and 115e, with channel reciprocity while relying on CSI feedback for the asymmetric UEs, UEs 115a, 115c, and 115d. eNB 105, with access to UE capabilities 1004, may also attempt to schedule symmetric UEs, UEs 115b and 115e, in one burst/frame without the need to send CSI-RS, while attempting to schedule asymmetric UEs, 115a, 115c, and 115d, in another burst/frame with the CSI-RS transmission in downlink.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 4, 5A, 5B, 6, 7, 8A, and 8B may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication in a time division duplex (TDD) multiple input, multiple output (MIMO) system, comprising:
   receiving an uplink reference signal from a served user equipment (UE) on each channel corresponding to one or more transmit antennas of the served UE, wherein the one or more transmit antennas are fewer than a plurality of receive antennas of the served UE;
   calculating a downlink channel estimate based on the uplink reference signal;
   receiving an interference report from the served UE, wherein the interference report identifies an interference level associated with one or more receive antennas with transmission capability;
   selecting a precoder based on the received interference report and the downlink channel estimate; and
   beamforming downlink data, using the selected precoder, for transmission to the served UE.

2. The method of claim 1, further including:
   estimating an adjustment value representing an estimated interference amount associated with one or more unmatched receive antennas of the served UE, wherein the one or more unmatched receive antennas include the plurality of receive antennas minus the one or more receive antennas with transmission capability; and
   selecting a transmission rate based on a combination of the interference level and the adjustment value.

3. The method of claim 1, further including:
   transmitting a beamformed channel state information (CSI) reference signal (CSI-RS) to the served UE, wherein the beamformed CSI-RS is beamformed using a reference precoder selected based on the interference level;
   receiving a channel quality indicator (CQI) from the served UE in response to the beamformed CSI-RS, wherein the CQI accounts for the plurality of receive antennas; and
   selecting a transmission rate based on the CQI.

4. The method of claim 1, further including:
   determining a rank of a channel of the downlink channel estimate based on a set of transmission associated parameters, wherein the set of transmission associated parameters includes one or more of:
   an interference report from the served UE;
   a geometry of the served UE;
   an antenna imbalance;
   a number of UE receive antennas; and
   an antenna correlation.

5. The method of claim 4, further including:
   selecting one or more additional beams to support the rank for the beamforming when the rank is greater than that supported on the one or more receive antennas with transmission capability, wherein the one or more additional beams are mutually orthogonal and orthogonal to a space spanned by the precoder.

6. The method of claim 4, further including:
   selecting a transmission rate based on one of:
   the interference report; or
   a channel quality indicator (CQI) feedback based on a precoded CSI-RS.

7. The method of claim 1, further including:
transmitting the beamformed downlink data to the served UE.

8. The method of claim 1, further including:
receiving transmit and receive antenna capabilities of the served UE; and
selecting the precoder based on the transmit and receive antenna capabilities from the served UE.

9. An apparatus configured for wireless communication, the apparatus comprising:
at least one processor; and
a memory coupled to the at least one processor,
wherein the at least one processor is configured:
to receive an uplink reference signal from a served user equipment (UE) on each channel corresponding to one or more transmit antennas of the served UE in a time division duplex (TDD) multiple input, multiple output (MIMO) system, wherein the one or more transmit antennas are fewer than a plurality of receive antennas of the served UE;
to calculate a downlink channel estimate based on the uplink reference signal;
to receive an interference report from the served UE, wherein the interference report identifies an interference level associated with one or more receive antennas with transmission capability;
to select a precoder based on the received interference report and the downlink channel estimate; and
to beamform downlink data, using the selected precoder, for transmission to the served UE.

10. The apparatus of claim 9, further including configuration of the at least one processor:
to estimate an adjustment value representing an estimated interference amount associated with one or more unmatched receive antennas of the served UE, wherein the one or more unmatched receive antennas include the plurality of receive antennas minus the one or more receive antennas with transmission capability; and
to select a transmission rate based on a combination of the interference level and the adjustment value.

11. The apparatus of claim 9, further including configuration of the at least one processor:
to transmit a beamformed channel state information (CSI) reference signal (CSI-RS) to the served UE, wherein the beamformed CSI-RS is beamformed using a reference precoder selected based on the interference level;
to receive a channel quality indicator (CQI) from the served UE in response to the beamformed CSI-RS, wherein the CQI accounts for the plurality of receive antennas; and
to select a transmission rate based on the CQI.

12. The apparatus of claim 9, further including configuration of the at least one processor:
to determine a rank of a channel of the downlink channel estimate based on a set of transmission associated parameters, wherein the set of transmission associated parameters includes one or more of:
an interference report from the served UE;
a geometry of the served UE;
an antenna imbalance;
a number of UE receive antennas; and
an antenna correlation.

13. The apparatus of claim 12, further including configuration of the at least one processor to select one or more additional beams to support the rank for the beamforming when the rank is greater than that supported on the one or more receive antennas with transmission capability, wherein the one or more additional beams are mutually orthogonal and orthogonal to a space spanned by the precoder.

14. The apparatus of claim 12, further including configuration of the at least one processor to select a transmission rate based on one of:
the interference report; or
a channel quality indicator (CQI) feedback based on a precoded CSI-RS.

15. The apparatus of claim 9, further including configuration of the at least one processor:
to transmit the beamformed downlink data to the served UE.

16. A method of wireless communication in a time division duplex (TDD) multiple input, multiple output (MIMO) system, comprising:
transmitting, by a user equipment (UE), an uplink reference signal to a serving base station on each channel corresponding to one or more transmit antennas of the UE, wherein the one or more transmit antennas are fewer than a plurality of receive antennas of the UE;
transmitting, by the UE, an interference report to the serving base station, wherein the interference report identifies an interference level associated with one or more receive antennas with transmission capability; and
receiving, by the UE, beamformed data, wherein the beamformed data is beamformed using a precoder, wherein the precoder is selected based on the transmitted interference report and a downlink channel estimate calculated based on the transmitted uplink reference signal.

17. The method of claim 16, wherein the downlink transmission is associated with a transmission rate selected based on a combination of the interference level and an adjustment value, wherein the adjustment value is estimated representing an estimated interference amount associated with one or more unmatched receive antennas of the UE, wherein the one or more unmatched receive antennas include the plurality of receive antennas minus the one or more receive antennas with transmission capability.

18. The method of claim 16, further including:
receiving a beamformed channel state information (CSI) reference signal (CSI-RS) from the serving base station, wherein the beamformed CSI-RS is beamformed using a reference precoder selected based on the interference level; and
transmitting a channel quality indicator (CQI) to the serving base station in response to the beamformed CSI-RS and for transmission rate selection, wherein the CQI accounts for the plurality of receive antennas.

19. The method of claim 16, wherein a rank of the downlink channel estimated is determined based on a set of transmission associated parameters, wherein the set of transmission associated parameters includes one or more of:
an interference report transmitted by the UE;
a geometry of the UE;
an antenna imbalance;
a number of UE receive antennas; and
an antenna correlation.

20. The method of claim 19, further including:
one or more additional beams to support the rank for the beamforming are selected when the rank is greater than that supported on the one or more receive antennas with transmission capability, wherein the one or more additional beams are mutually orthogonal and orthogonal to a space spanned by the precoder.

21. The method of claim 19, wherein the beamformed data is associated with a transmission rate based on one of:
the interference report; or
a channel quality indicator (CQI) feedback based on a precoded CSI-RS.

22. The method of claim 16, further including:
receiving the beamformed data from the serving base station.

23. The method of claim 16, further including:
sending transmit and receive antenna capabilities to the serving base station.

24. An apparatus configured for wireless communication, the apparatus comprising:
at least one processor; and
a memory coupled to the at least one processor, wherein the at least one processor is configured:
to transmit, by a user equipment (UE), an uplink reference signal to a serving base station on each channel corresponding to one or more transmit antennas of the UE, wherein the one or more transmit antennas are fewer than a plurality of receive antennas of the UE;
to transmit, by the UE, an interference report to the serving base station, wherein the interference report identifies an interference level associated with one or more receive antennas with transmission capability; and
to receive, by the UE, beamformed data, wherein the beamformed data is beamformed using a precoder, wherein the precoder is selected based on the transmitted interference report and a downlink channel estimate calculated based on the transmitted uplink reference signal.

25. The apparatus of claim 24, wherein the downlink transmission is associated with a transmission rate selected based on a combination of the interference level and an adjustment value, wherein the adjustment value is estimated representing an estimated interference amount associated with one or more unmatched receive antennas of the UE, wherein the one or more unmatched receive antennas include the plurality of receive antennas minus the one or more receive antennas with transmission capability.

26. The apparatus of claim 24, further including configuration of the at least one processor:
to receive a beamformed channel state information (CSI) reference signal (CSI-RS) from the serving base station, wherein the beamformed CSI-RS is beamformed using a reference precoder selected based on the interference level; and
to transmit a channel quality indicator (CQI) to the serving base station in response to the beamformed CSI-RS and for transmission rate selection, wherein the CQI accounts for the plurality of receive antennas.

27. The apparatus of claim 24, wherein a rank of the downlink channel estimated is determined based on a set of transmission associated parameters, wherein the set of transmission associated parameters includes one or more of:
an interference report transmitted by the UE;
a geometry of the UE;
an antenna imbalance;
a number of UE receive antennas; and
an antenna correlation.

28. The apparatus of claim 27, further including:
one or more additional beams to support the rank for the beamforming are selected when the rank is greater than that supported on the one or more receive antennas with transmission capability, wherein the one or more additional beams are mutually orthogonal and orthogonal to a space spanned by the precoder.

29. The apparatus of claim 27, wherein the beamformed data is associated with a transmission rate based on one of:
the interference report; or
a channel quality indicator (CQI) feedback based on a precoded CSI-RS.

30. The apparatus of claim 24, further including configuration of the at least one processor:
to receive the beamformed data from the serving base station.

* * * * *